May 4, 1965 R. H. BISBING 3,181,905
DRAW PULL CATCH
Filed April 2, 1963 2 Sheets-Sheet 1
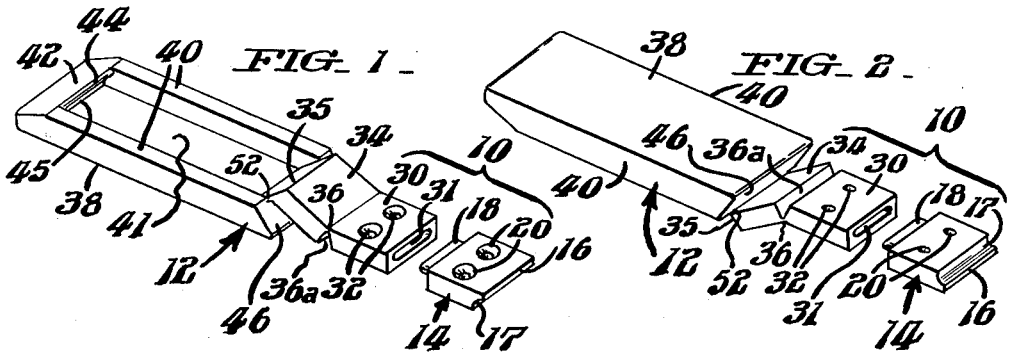
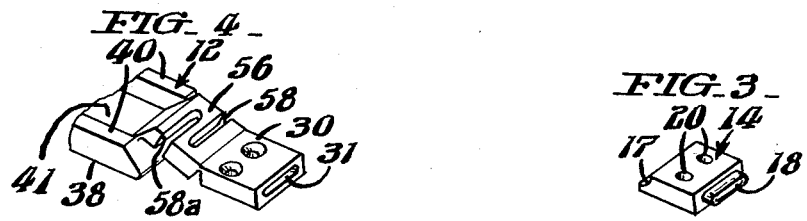
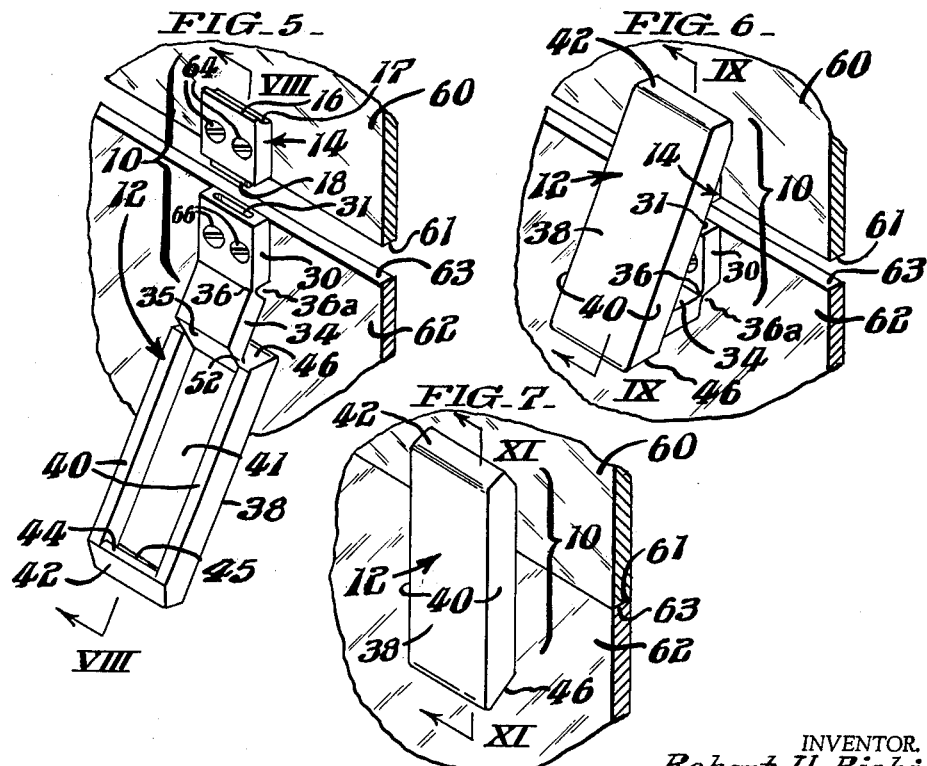
INVENTOR.
Robert H. Bisbing,
BY
Paul & Paul
ATTORNEYS.

May 4, 1965 R. H. BISBING 3,181,905
DRAW PULL CATCH
Filed April 2, 1963 2 Sheets-Sheet 2
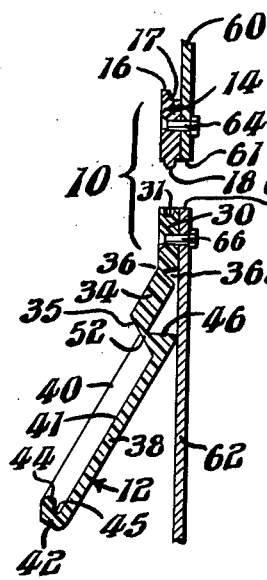
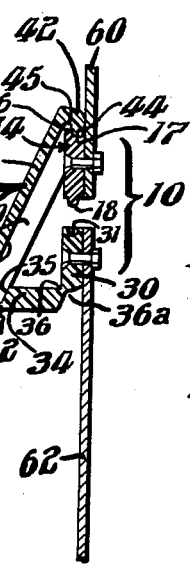
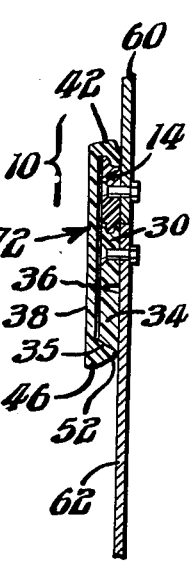
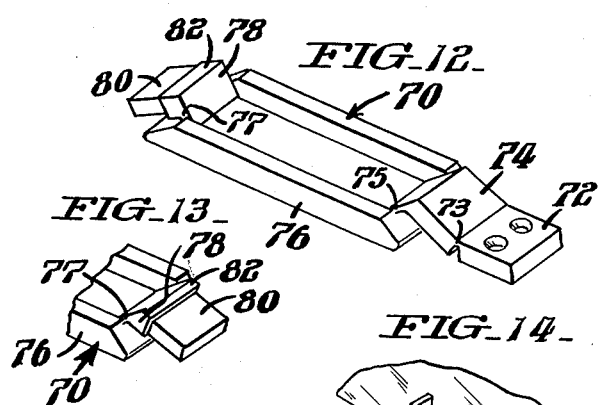
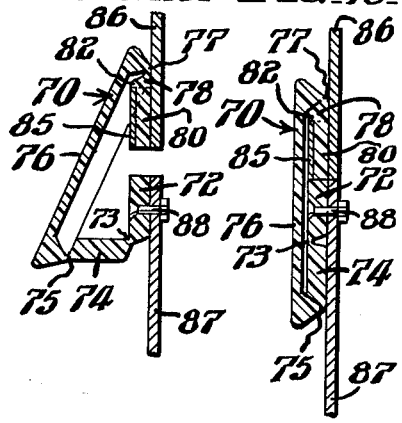
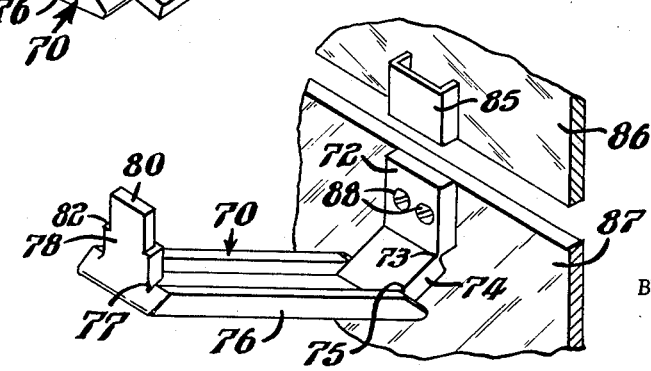
INVENTOR.
Robert H. Bisbing,
BY
Paul & Paul
ATTORNEYS.

United States Patent Office 3,181,905
Patented May 4, 1965

3,181,905
DRAW PULL CATCH
Robert H. Bisbing, Upper Darby, Pa., assignor to South Chester Corporation, Lester, Pa., a corporation of Delaware
Filed Apr. 2, 1963, Ser. No. 270,067
12 Claims. (Cl. 292—109)

This invention relates to a catch for locking two members or panels together. More specifically, this invention relates to a catch having but one or two components, one component formed with flexible segments so that upon proper engagement of the components and manual application of pressure, the catch draws together and locks the two panels.

The usual draw pull catch has one detachable component which engages two other components each attached to a panel so as to draw the panels together when pressure is applied to the joining component of the catch. In these prior art devices three or four separate and distinct components, connected by one or more pivot members such as cross pins and the like, are required. The pivot members connect the components while permitting them to rotate and engage the fixedly mounted members.

It is the primary object of this invention to provide a catch having only two or even one part which is constructed of a flexible material so that the catch is inexpensive to manufacture and yet effective to draw together and lock two panels or the like.

It is a further object of this invention to provide a draw pull catch wherein the parts are formed from a flexible material which does not weaken after repeated flexures and which has qualities of superior corrosion resistance and chemical inertness.

It is another object of this invention to provide a draw pull catch wherein all the parts are completely covered by a single component so as to present a pleasing appearance and to avoid snagging by and on foreign objects. These and other objects and attendant advantages are described hereinbelow and in the attached drawings wherein:

FIG. 1 is a perspective view of one form of the catch of this invention consisting of two parts;

FIG. 2 is a perspective view of the catch shown in FIG. 1 as seen from the reverse side;

FIG. 3 is a perspective view from the reverse side of one part of the catch shown in FIGS. 1 and 2;

FIG. 4 is a perspective view of a modification of the catch shown in FIG. 1;

FIG. 5 is a perspective view of the catch of FIG. 1 showing one method of mounting the catch on two panels;

FIG. 6 is a perspective view of the mounted catch in the partially closed position;

FIG. 7 is a perspective view of the mounted catch in the fully closed position;

FIG. 8 is a sectional view of the catch taken along the lines and arrows VIII—VIII as shown in FIG. 5;

FIG. 9 is a sectional view of the catch taken along the lines and arrows IX—IX as shown in FIG. 6;

FIG. 10 is a sectional view of the mounted catch wherein the closing is more complete;

FIG. 11 is a sectional view taken along the lines and arrows XI—XI of FIG. 7 showing the catch in the fully closed position;

FIG. 12 is a perspective view of one modification of the catch shown in FIG. 1 wherein the catch has but a single part;

FIG. 13 is an enlarged perspective view of left end of the modified catch as shown in FIG. 12;

FIG. 14 is a perspective view of one method of mounting the modified catch on two panels;

FIG. 15 is a sectional view of the mounted catch in the partially closed position; and FIG. 16 is a sectional view of the mounted catch in the fully closed position.

Although a preferred form of the draw pull catch of this invention is illustrated in the drawings and described hereinbelow, is should be understood that other forms, modifications and equivalents thereof can be substituted therefor without departing from the spirit of this invention or the scope of the appended claims.

Referring first to FIG. 1 of the drawings, one form of the draw pull catch according to the teaching of this invention is generally designated by the numeral 10. The catch comprises a latch or segmented part 12 and a separate stud or projecting part 14.

The stud part 14, although shown having a flattened cubical shape in the drawings, can be formed in other suitable shapes and can be formed integral with one panel to be joined. The stud is equipped with an extending flange 16 at one end and a plug 18 at the other end. Flange 16 extends completely across the width of the stud part 14 adjacent the top surface with a curved recessed area 17 below, while plug 18 is more centrally located both in width and depth on the stud. Countersunk holes 20 are provided in stud 14 so that the element can be securely bolted, screwed or nailed to one of the locked panels or members.

The latch part 12 of the catch 10 is basically a one-piece, segmented part consisting of a base or stationary segment 30 joined by a thin, flexible connection 36 to an intermediate or connecting segment 34 which in turn is joined by another flexible connection 52 to a locking segment 38. The base segment 30 is provided with two countersunk holes 32 which are designed to receive a pair of bolts, etc., so that the segment 30 and the entire segmented part 12 can be securely fastened to the second panel or member which is to be locked to the first panel. A centrally located deep groove 31 is provided in the open end of segment 30, the groove being of such dimension to accept and tightly hold therein plug 18 of the stud 14. Provision of stud 18 and groove 31 as described above allows the stud and latch parts to be correctly aligned thus preventing undesired side movement when the two parts are engaged. Holes 20, 32 are countersunk so that screws or the like will fit flush with the top surfaces of the stud and segment 30.

The intermediate segment 34 of the latch part is roughly cubical in shape and has a flat beveled edge 35 at the end opposite to the flexible connection 36. Connection 36 and the space 36a located therebeneath provides for easy flexing of the two segments 30, 34.

Locking segment 38 has roughly a box shape with two parallel side walls 40 and an end wall 42. The center area 41 is as wide as segments 34 and 30, and stud 14. End wall 42 is constructed so as to have overhanging edge 44 located toward the top, as shown in FIG. 1, and a slightly recessed area 45 therebeneath. At the opposite end of locking segment 38, end wall 46 is beveled on the outside and on the inside so as to have a triangular shape in sectional view. Flexible connection 52 joins the segments 34 and 38 allowing free movement at this point. The function of these beveled surfaces and shapes is described below.

In FIG. 2, the draw pull catch illustrated in FIG. 1 is shown inverted. It is apparent from the figure that the stud flange 16 is located adjacent the upper surface of the stud when the stud is mounted as shown in FIG. 1. Base segment 30 and intermediate segment 34 of the segmented latch part are flat and smooth on the bottom surfaces which fit against the surface of the members to be locked. It should be understood as clearly illustrated in FIGS. 1 and 2, that the segments 30, 34 and 38 are strongly joined and flexibly connected at connections 36 and 52 so that these portions are free to flex in relation to one another, as described below.

In FIG. 3, the plug 18 of the stud 14 is shown in greater detail. In FIG. 4, a modification of the catch shown shown in FIGS. 1 and 2 is presented in which the intermediate segment 56 is substantially different from the corresponding segment 34 shown in FIG. 1. Segment 56 has alternate cut out portions 58, 58a which are designed to allow and compensate for compression of part 12, shrinkage and for variations in mounting positions. The cut out portions 58, 58a allow intermediate segment 56 to move slightly to either side thereby allowing proper alignment of the locking segment 38.

Referring now to FIGS. 5 through 7, installation and operation of the preferred form of the draw pull catch shown in FIGS. 1 and 2 are illustrated. In FIG. 5, the stud 14 is mounted on one panel or member 60 which is to be locked to and against a second panel 62. It should be understood that the catch of this invention can effectively be used in various structural arrangements so as to lock large boxes, panels or the like together. Two bolts 64 pass through the stud and panel and hold stud 14 securely against the face of panel 60 and adjacent the lower edge 61. It should be observed that the stud plug 18 extends slightly beyond the lower edge 61 of panel 60 and as such is in position to fit within groove 31 of segment 30 which is likewise mounted adjacent the upper edge 63 of panel 62. The intermediate segment 34 is shown partially flexed at connection 36 and supporting the locking segment 38 hanging therebeneath. It should be recognized that the parts 12 and 14 can be arranged in the reverse position or in any other position so long as they are opposing and attached to the panels which are to be locked together.

In FIG. 6, the locking segment 38 has been rotated around flexible connection 52 so that the extending edge 44 is positioned over flange 16 of the stud 14. When so positioned, flange 16 fits within indentation 45 so that the locking segment 38 is securely held by the stud. It is apparent that the width of stud 14 must be slightly less than or just equal to the distance between the two side walls 40 of the locking segment 38.

In FIG. 7, locking segment 38 has been manually pressed downward at its lower end by the operator so that intermediate segment 34 is flat against the surface of panel 62 and in alignment with segment 38. As further disclosed in FIGS. 10 and 11, intermediate segment 34 and the end wall 46 of portion 38 are so shaped that when locking segment 38 is pressed into locking position, as shown in FIG. 7, it becomes locked in that position and unable to spring outwardly. The locking occurs because the segments form a toggle catch in which flexible connection 52, when locked, is closer to panel 63 than flexible connection 36. As the upward moment of force on locking segment 38 is concentrated at connection 52 adjacent panel 63, segment 34 is pressed upward against fixedly mounted base segment 30 and the flexible connection 36 is held closed. When locking segment 38 and, in particular connection 52, is pulled away from panel 63, the moment of force on connection 52 is positioned further away from the panel than connection 36 and the catch swings open. It should be recognized that segment 38 completely covers the other segments and stud 14 of the catch so that the outward appearance is solely that of a smooth, substantially flat cubical latch.

Referring now to FIGS. 8 through 11, the draw pull catch as shown in perspective view in FIG. 1 is illustrated in these figures in sectional view.

FIG. 8 depicts the catch in the same position as shown in FIG. 5 wherein stud 14 and base segment 30 are held by a plurality of bolts 64 and 66 to panels 60, 62.

In FIG. 9, locking segment 38, and particularly protruding edge 44, is locked around stud flange 16 thereby securing the top of the locking segment 38 to the stud 14. As locking segment 38 is pressed downwardly, the top panel moves into contact against the bottom panel 62 as shown in FIG. 10. At this point, stud plug 18 becomes firmly centered within groove 31 of segment 30 thereby positioning and aligning the two catch parts and the two panels.

In FIG. 11, locking segment 38 is in the fully closed position whereby all three segments or portions 30, 34 and 38 extend parallel to the panels.

A modification of the catch shown in FIG. 1 is illustrated in FIGS. 12 through 16. Referring to FIG. 12, the catch 70 is of unitary construction and consists of a base segment 72, an intermediate segment 74, a locking segment 76 and a stud segment 78. Flexible connections 73, 75, and 77 join the four segments. Segment 78, corresponding to stud part 14 in the catch of FIG. 1, is shown in FIG. 13 and consists of a plug portion 80 and a collar portion 82. Referring to FIG. 14, a U-shaped receiving member 85 is mounted on top panel 86 and said member is of such dimension as to receive and hold therein the plug portion 80 of the catch 70, as shown in FIGS. 15 and 16. Receiving member 85 can be formed integrally with panel 86 and stud segment 78 can be otherwise shaped so as to grasp the receiving member and the top panel 86 according to other equivalent mechanical structures. Bolts 88 anchor the catch 70 to the lower panel 87 as shown.

When the modified catch is operated to draw and lock together the two panels or the like, the stud segment is placed within the receiving member 85 attached to panel 86, as shown in FIG. 15, and when pressure is applied to the lower part of the locking segment 76, the catch springs into the locked position as shown in FIG. 16. As described supra, the catch is held in the locked position because connection 75 is positioned tight against panel 87 while connection 73 is some distance away from the panel, and the force pulling locking segment 76 upward is focused at connection 75. When the panels are to be separated, locking segment 76 is pulled outwardly at the bottom away from panel 87 until intermediate portion 74 flexes outwardly as shown in FIG. 15.

It should be apparent from the description of the modified catch of FIG. 12, that the catch of this invention can take the form of two separate parts, each mounted on separate panels, or, that a single segmented part, provided with a suitable detachable mounting on one panel, can be utilized with equal advantage.

This catch of the invention can be formed or manufactured from a number of materials which are sufficiently flexible and strong. A preferred material for the catch and, in particular, the segmented flexible element is polypropylene, but other species in the group of thermoplastics having similar characteristics also can be used. Polypropylene is an extremely suitable material because it is capable of practically unlimited number of flexings without weakening or failure of the material.

Although the preferred form of the invention is shown and described herein, various modifications can be made therein, including the substitution of equivalents, reversing of parts, and the use of certain features without the use of others. All such modifications are within the spirit and scope of this invention as defined in the appended claims.

Having described my invention, I claim:

1. In a catch for securing two members together, the combination comprising a part adapted for being affixed to one of said members and a one-piece part including base, locking and intermediate segments, said base segment being adapted for being affixed to the second one of said members, said intermediate segment being flexibly connected to said base and locking segments for pivotal movement of said segments about transverse axes, and when in the locked condition said intermediate segment being disposed substantially in coplanar relation to said base segment and said locking segment being disposed in overlying relation to said base and intermediate segments and to the first mentioned part, said locking segment being detachably connected to the first mentioned part, and the flexible connection between said intermediate and locking segments being closer to said second member than the flexible connections between said intermediate and base segments.

2. The catch as defined in claim 1 wherein the first mentioned part is provided with a flange and recessed area on one end and the locking segment of the second mentioned part is provided with a flange and recessed area at one end, said flanges and recessed areas being arranged so that when the first mentioned part and locking segment are operatively engaged the flange and area of each are oppositely engaged locking said part and said segment together.

3. The catch is defined in claim 2 wherein the first mentioned part is provided with a plug and the base segment of the segmented part is provided with a groove, the plug and groove being positioned on opposing surfaces of said part and segment whereby upon locking of the catch the plug of the first mentioned part enters the groove of the base segment is held therein against lateral movement.

4. The catch as defined in claim 3 wherein the locking segment is substantially box shaped whereby upon entry into the full locking position, the locking segment completely envelopes the base and intermediate segments and the first mentioned part.

5. The catch as defined in claim 4 wherein a flexible connection joins the said three segments of the segmented part allowing flexing at the connecting points.

6. The catch as defined in claim 5 wherein the first mentioned part is adapted to be mounted on a first member adjacent one edge thereof, the plug of said part extending beyond the edge of said member, and wherein the base segment of the second mentioned part is adapted to be mounted on the second member adjacent one edge thereof which opposes the edge of the first member whereby upon locking the two parts together, the plug enters within the groove of the base segment.

7. The catch as defined in claim 6 wherein the intermediate segment is provided with cut out portions whereby slight lengthwise and lateral movement is permitted.

8. The catch as defined in claim 7 wherein the segmented part is composed of polypropylene.

9. In a catch for securing two members together, the combination consisting of a part adapted for being affixed to one of said members and a one-piece part including base, locking and intermediate segments, said base segments being adapted for being affixed to the second one of said members, said intermediate segment being flexibly connected to said base and locking segments for pivotal movement of said segments about transverse axes, the first mentioned part having a flange and recessed area at one end and a plug at the opposite end, said base segment having a groove at one end adapted to receive the plug of the first mentioned part when the parts are operatively engaged, the locking segment having approximately a box shape of such dimension as to overlie the first mentioned part and the base and intermediate segments when said locking segment is engaged with the first mentioned part, and the flexible connection between said intermediate and locking segments positioned closer to said second member than the flexible connection between said intermediate and base segments when the catch is operatively engaged and the members locked together.

10. The catch as defined in claim 9 wherein the segmented part is composed of a thermoplastic.

11. In a catch for securing two members together, the combination consisting of retaining means affixed to one of said members, and a one-piece part including base, locking, intermediate and stud segments, said base segment being adapted for being affixed to the second one said members, said segments being flexibly connected for pivotal movement about transverse axes, and when in the locked condition said intermediate segment being disposed substantially in coplanar relation to said base segment and said locking segment being disposed in overlying relation to said base, intermediate and study segments, said stud segment being detachably engaged with the retaining means, and the flexible connection between said intermediate and locking segments being closer to said second member than the flexible connection between said intermediate and base segments.

12. The catch as defined in claim 11 wherein the stud segment is provided with a plug and collar portion, said plug portion being of such dimension as to fit with the retaining means affixed to the first member whereby the stud segment becomes detachably connected to the first member.

References Cited by the Examiner

UNITED STATES PATENTS

| 2,798,371 | 7/57 | Gehrie | 70—73 |
|---|---|---|---|
| 2,829,912 | 4/58 | Koch | 70—73 |
| 2,855,632 | 10/58 | Croce et al. | 18—59 |
| 2,947,559 | 8/60 | Olsson | 292—128 |
| 3,019,486 | 2/62 | Stinson. | |

M. HENSON WOOD, Jr., *Primary Examiner.*

THOMAS J. HICKEY, *Examiner.*

UNITED STATES PATENT OFFICE
CERTIFICATE OF CORRECTION

Patent No. 3,181,905                            May 4, 1965

Robert H. Bisbing

It is hereby certified that error appears in the above numbered patent requiring correction and that the said Letters Patent should read as corrected below.

Column 5, line 13, for "oppositely" read -- opposingly -- line 15, for "is" read -- as --; line 21, after "segment" insert -- and --; same column 5, line 49, for "segments" read -- segment --; column 6, line 21, after "one" insert -- of --; line 27, for "study" read -- stud --.

Signed and sealed this 21st day of September 1965.

(SEAL)
Attest:

ERNEST W. SWIDER                                  EDWARD J. BRENNER
Attesting Officer                                      Commissioner of Patents